United States Patent

Tojo et al.

[11] Patent Number: 6,104,841
[45] Date of Patent: *Aug. 15, 2000

[54] METHOD AND APPARATUS FOR READING AND PROCESSING AN IMAGE AT A RATE DETERMINED BY THE MAGNIFICATION TO BE APPLIED TO THE IMAGE

[75] Inventors: Yu Tojo; Takahiro Hideshima; Akira Ichizuka; Kazuteru Kowada, all of Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/564,809

[22] Filed: Nov. 29, 1995

[30] Foreign Application Priority Data

Nov. 29, 1994 [JP] Japan .................................. 6-317750

[51] Int. Cl.⁷ ...................................................... G06K 9/32
[52] U.S. Cl. .............................. 382/299; 348/98; 348/112
[58] Field of Search .................................... 382/312, 298, 382/299; 358/412, 451, 474, 483; 355/55; 348/98, 112, 196; 399/196, 205, 208

[56] References Cited

U.S. PATENT DOCUMENTS

| | | | |
|---|---|---|---|
| 3,564,154 | 2/1971 | Camras | 360/116 |
| 4,394,693 | 7/1983 | Shirley | 358/451 |
| 4,562,485 | 12/1985 | Maeshima | 358/474 |
| 4,595,281 | 6/1986 | Oushiden et al. | 355/31 |
| 4,679,096 | 7/1987 | Nagashima | 358/451 |
| 4,687,944 | 8/1987 | Mitsuka et al. | 358/474 |
| 4,853,748 | 8/1989 | Okamoto et al. | 355/55 |
| 4,860,118 | 8/1989 | Arimoto | 358/451 |
| 4,926,489 | 5/1990 | Danielson et al. | 382/144 |
| 4,934,821 | 6/1990 | Morton | 348/112 |
| 4,943,870 | 7/1990 | Sugishima | 358/451 |
| 4,958,189 | 9/1990 | Yoshida | 399/196 |
| 5,351,138 | 9/1994 | Sasaki et al. | 358/448 |
| 5,430,550 | 7/1995 | Hashimoto et al. | 358/488 |

*Primary Examiner*—Amelia Au
*Assistant Examiner*—Timothy M. Johnson
*Attorney, Agent, or Firm*—Sughrue, Mion, Zinn, Macpeak & Seas, PLLC

[57] ABSTRACT

An image is read by moving a line sensor relative to the image in a subsidiary scanning direction perpendicular to the direction of a pixels array of the line sensor. An image processor receives image signals from the sensor and produces an output image magnified relative to the image in accordance with a magnification ratio. The magnification ratio falls into one of n contiguous magnification ratio ranges between a reference magnification ratio and a minimum magnification ratio. The moving speed of the sensor relative to the image is set as a function of the magnification ratio such that, within each magnification ratio range i, for i=2 to n, the moving speed of the sensor decreases from a maximum speed at a lowest magnification ratio in the magnification ratio range to the maximum speed decreased by 1/i at a highest magnification ratio in the magnification ratio range, and, for i=1, the moving speed of the sensor decreases from the maximum speed at a lowest magnification ratio in the magnification ratio range to a reference speed at a highest magnification ratio in the magnification ratio range.

6 Claims, 8 Drawing Sheets

METHOD AND APPARATUS FOR READING AND PROCESSING AN IMAGE AT A RATE DETERMINED BY THE MAGNIFICATION TO BE APPLIED TO THE IMAGE

BACKGROUND OF THE INVENTION

1. Field of the Invention

The present invention relates to a method of reading and processing images such as those recorded or photographed on microfilms by using a line sensor.

2. Related Art

Conventionally, there is provided a microfilm scanner for reading images of microfilms by using an image sensor such as a line sensor. By reading images with the image sensor, the read images can be processed as digital image signals, which makes it easier to output them to a printer, to store them in an optical magnetic disk, or to transfer them to another image processor.

For this type of a microfilm scanner, it is known to change a magnification (or scale factor) of output images by changing an image density of images read by a line sensor, whereas a magnifying power of an optical system is fixed, since it makes construction of the optical system simpler so as to achieve significant compaction and weight savings.

Since an original is reduced in scale generally to one-tenth (1/10) through one-fiftieth (1/50) to be photographed on microfilms, the photographed image is expanded to 10 through 50 times the size of the microfilm image when outputting images after being read. The output image size is predetermined, for example, for printing and for displaying on a CRT display. Therefore, it is required that the images be fitted to the predetermined or fixed size before being output and that the magnifications or scale factors should be changed in consideration with a frame size of the films.

For changing an output magnification ratio, the output image size can be reduced by intermittently deleting pixel signals read by the line sensor along the main and subsidiary direction at a certain ratio. In addition, it can be expanded by repeating a portion or portions of identical pixel signals along the main and subsidiary direction at a certain ratio. If the image size is reduced to a scale smaller than that of a magnification (scale factor) at which all pixels of the line sensor can be output without deleting nor repeating (hereinafter, "reference magnification or scale factor"), a spacing from a portion of the projected image to the next portion of the projected image, both portions being read by the line sensor, must be expanded in comparison with that for the reference magnification.

Conventionally, however, an image reading or scanning speed of the line sensor is always fixed, therefore, image areas unnecessary for outputting their image signals are also read though they will not be used for an output of the images when read images is reduced to a size of a magnification ratio which is smaller than the reference magnification ratio. It results in a wasteful long-time reading of the images. Accordingly, to solve this problem, there is a way to extend a read spacing in a subsidiary scanning direction by increasing a moving speed of the line sensor. In other words, the distance between the adjacent main scanning lines are extended.

Although the moving speed of the line sensor is increased as the reduction ratio becomes greater, there is a limitation on increasing the moving speed since a stepping motor generally used for moving a line sensor also has a limit on a driving speed.

SUMMARY OF THE INVENTION

The present invention is provided as being anticipated based on these facts. It is a first object of the present invention to provide a method of reading and processing an image which allows reduction of time for reading the image when outputting images whose magnification is reduced to a magnification smaller than the reference magnification.

It is a second object of the present invention to provide a method of reading and processing an image which allows increasing a reduction rate without being restricted by limitations on a driving speed of a stepping motor used for moving a line sensor when increasing the moving speed of the line sensor.

According to the present invention, the first object is accomplished by a method of reading and processing an image wherein the image is read by moving a line sensor relatively to the image in a subsidiary scanning direction perpendicular to the direction of pixels array of the line sensor and a magnification ratio for outputting the image is changed by changing image density, characterized by the moving speed of said line sensor being changed so as to be inversely proportional to an increase or decrease of said magnification ratio.

The second object is accomplished by the method, wherein the moving speed of said line sensor is set to 1/n (n is a positive integer which is equal to or greater than 2) of the maximum moving speed of said line sensor whenever the moving speed reaches its maximum speed according to the decrease of the magnification ratio, and wherein said image is read by using a single main scanning line for n main scanning lines of said line sensor.

DETAILED DESCRIPTION OF THE PREFERRED EMBODIMENTS

Figure 1:
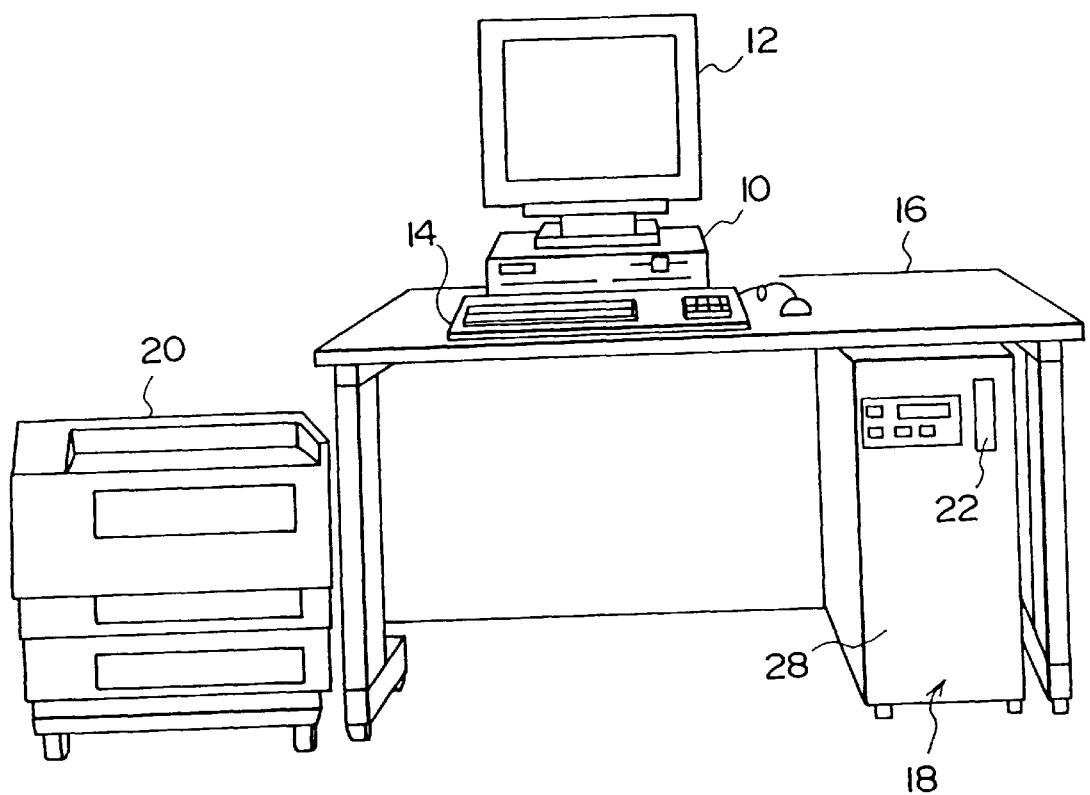
FIG. 1 is a diagram showing all the parts of an image reading and processing apparatus which incorporates a microfilm scanner of an embodiment according to the invention.

Referring to FIG. 1, there is shown a computer body 10, containing a CPU or other processing means. A CRT display device 12 and a keyboard 14 are put on a desk 16. A scanner 18 is put under the desk 16 and a printer 20 is placed at the side of the desk 16. The scanner 18 has a cartridge loading port 22 in the upper portion of the front panel, and reads images recorded on a microfilm 26 contained in a cartridge 24 (See FIGS. 2 and 3) which has been inserted into the cartridge loading port 22. The read image is processed in predetermined image processing by the CPU or the like in the computer body 10. The processed image is displayed on the display device 12. The read image is output to the printer 20, and either stored in an optical magnetic disk or transferred to an external processor.

A scanner 18 has a longitudinal cabinet 28, in which there are arranged a feed reel driving unit 30 at the upper portion of the front side in the cabinet 28 and a take-up reel driving unit 32 at the lower portion in the cabinet 28. When the cartridge 24 is inserted into the cartridge loading port 22, the cartridge 24 is moved automatically so that a reel 24A held in the cartridge engages with a rotating shaft of the feed reel driving unit 30. And then, the feed reel driving unit 30 pulls out a head lead of the roll film 26 from the cartridge 24 and feeds it downward to guide it to a take-up reel 32A in the take-up reel driving unit 32.

Figure 2:
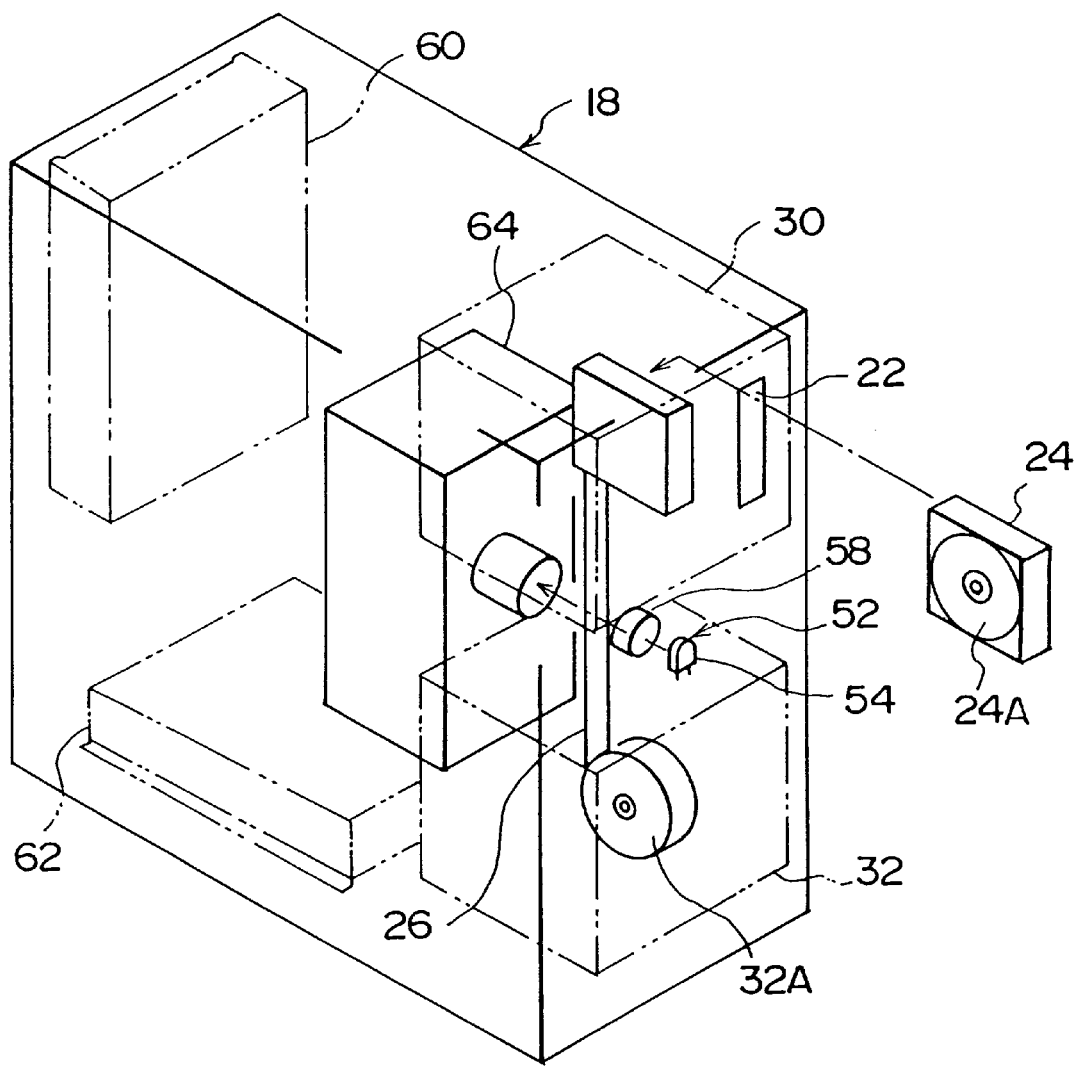
FIG. 2 is a perspective view illustrating the interior of the scanner of the embodiment in FIG. 1.
Figure 3:
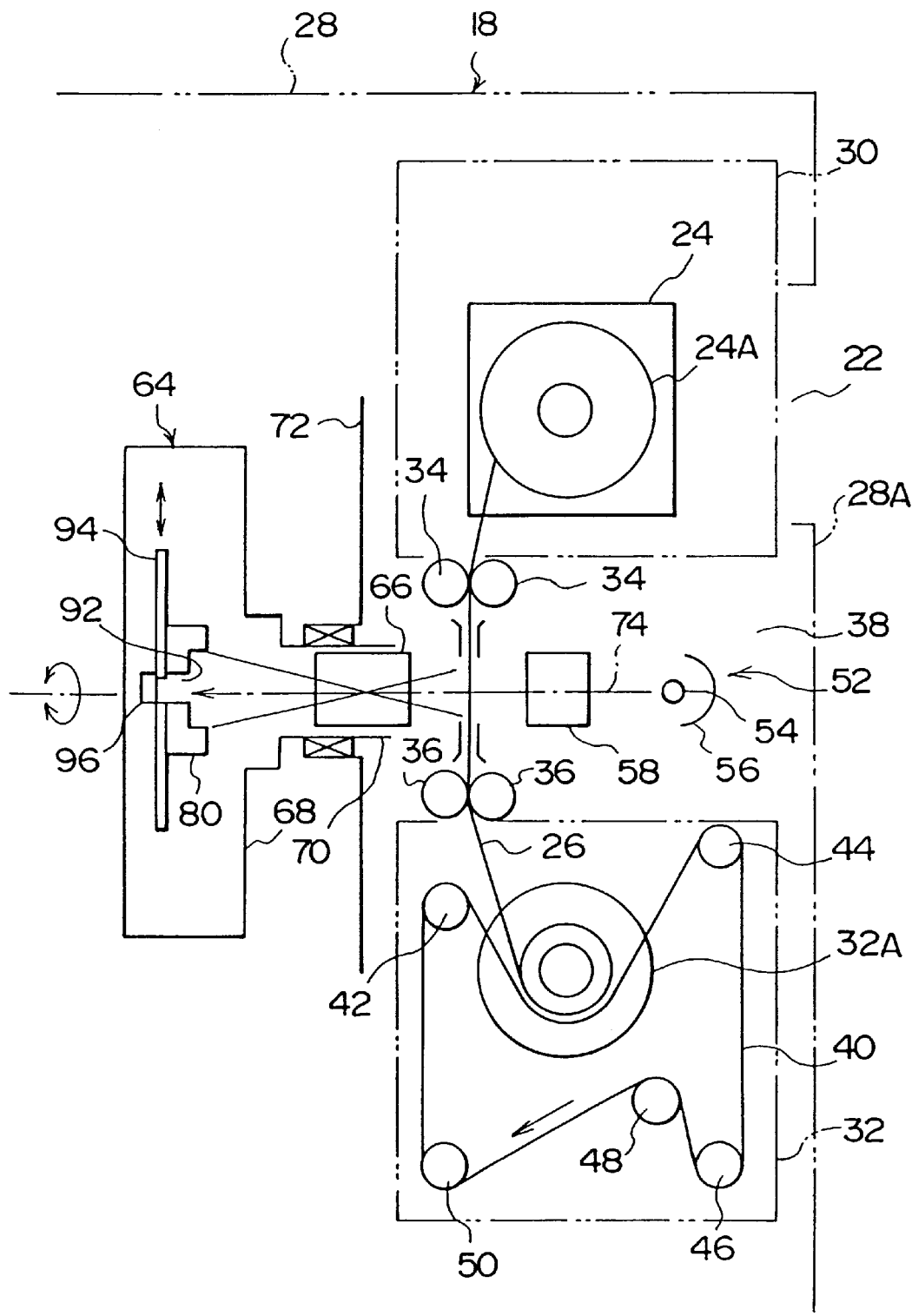
FIG. 3 is a side view illustrating an arrangement of main parts of the scanner in FIGS. 1 and 2.

When viewing the scanner 18 in FIGS. 2 and 3, the film passes through the rear side of the empty space between the reel driving units 30, 32, that is, the film 26 passes through at the inner back side viewed from the front of the cabinet 28. Referring to FIG. 3, there are shown guide rollers 34, 34, 36, and 36 for guiding the film 26. Accordingly, a space 38 is formed by a gap between the reel driving units 30, 32 and a front panel 28A of the cabinet 28, and a light source 52 described later is housed in this space.

The take-up reel driving unit 32 has a drive belt 40 which runs in contact with the reel 32A as shown in FIG. 3. The drive belt 40 is wound on guide rollers 42 and 44, a driving roller 46, an encoder 48 and a tension roller 50, and it is driven for running in a film take-up direction (indicated by an arrow in FIG. 3) by the driving roller 46.

The light source 52 is housed in the space 38 between the above-described two reel driving units 30 and 32, having a lamp 54, a reflector 56, a condenser lens 58, and an appropriate filter. In FIG. 2, there are illustrated a power supply circuit 60 and a power control circuit 62 for controlling an actuator such as a motor.

Figure 4:
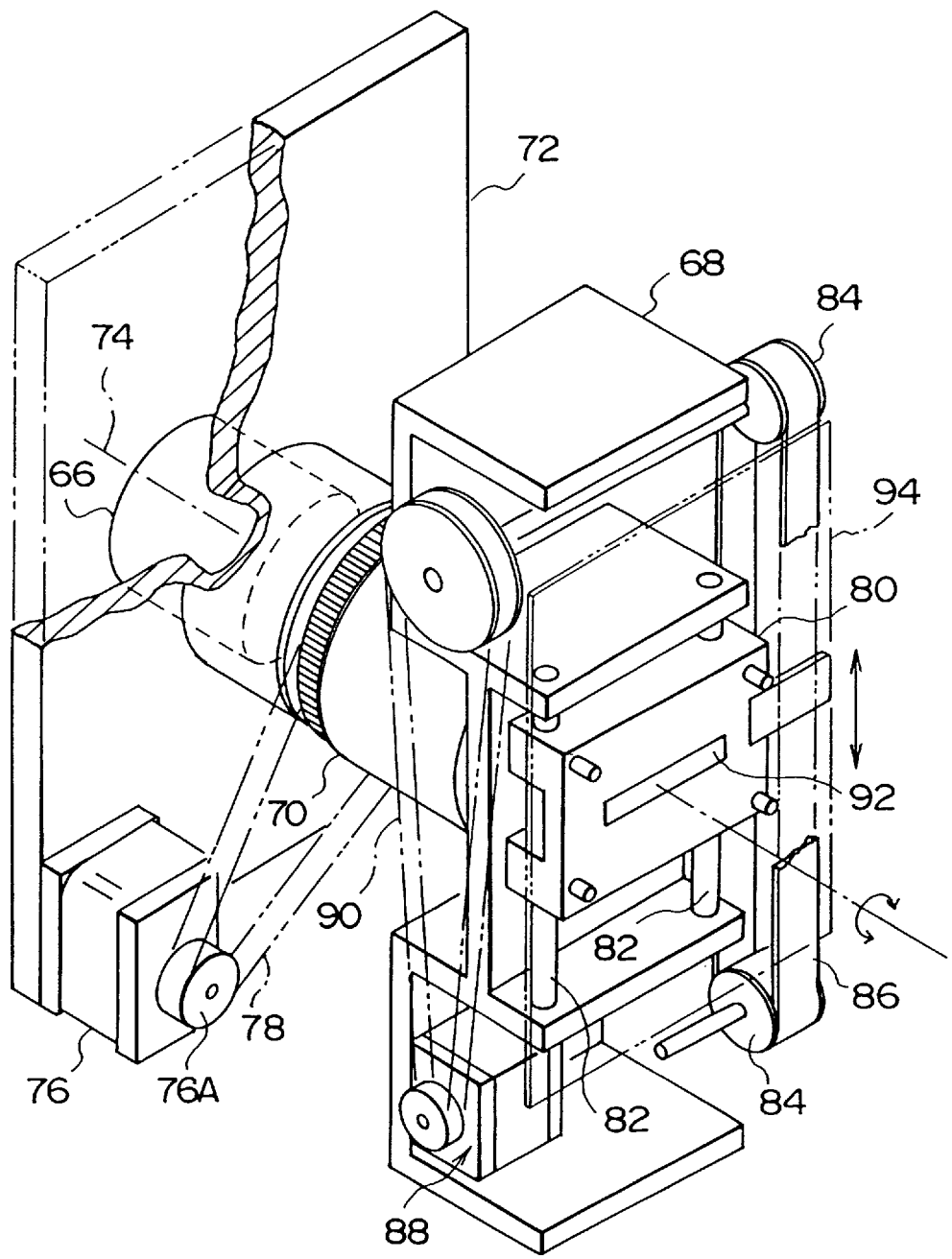
FIG. 4 is a perspective view illustrating a line sensor unit of the scanner in FIG. 3.

A line sensor unit 64 will now be described. The line sensor unit 64 is integrated with a projection lens 66. More specifically, as shown in FIGS. 3 and 4, a cylindrical section 70 for holding the projection lens 66 is integrally formed with a frame (rotatable frame) 68 of the line sensor unit 64. The projection lens 66 mounted in this cylindrical section 70 is a fixed focus lens with a magnifying power of approx. 2. The cylindrical section 70 is held rotatably in a frame (fixed frame) 72 fixed to the cabinet 28. Thus, the cylindrical section 70 rotates along a light axis 74 perpendicular to the direction of a plane of the film 26.

A belt 78 is wound on the cylindrical section 70 and a pulley 76A of a servo motor 76 mounted on a fixed frame 72. The rotary frame 68 can be rotated around the light axis 74 by the rotation of the motor 76.

On the rotary frame 68, a movable plate 80 is provided on the side opposite to the cylindrical section 70 as shown in FIG. 4. In detail, the movable plate 80 is slidably mounted along with a pair of guide rods 82 and 82 to permit the movable plate 80 to reciprocate, along a plan which is vertical to the light axis 74, around the opening of the cylindrical section. In the rotary frame 68, a belt 86 wound on pulleys 84 and 84 is set in a direction parallel to the up-and-down moving direction of the movable plate 80, and one side of the movable plate 80 is fixed to the belt 86. To one pulley 84, the rotation of the servo motor 88 is transmitted through a belt 90. As a result, the movable plate 80 can be moved up and down on a plane perpendicular to the light axis 74 by rotating the servo motor 88 in a forward or inverse direction.

On the movable plate 80, a longitudinal window (narrow slit) 92 is formed in a direction perpendicular to the guide rods 82, 82, that is, perpendicular to the up-and-down moving direction of the movable plate 80. The window 92 has its longitudinal center positioning on the light axis 72. In the rear side of the movable plate 80, that is, the side opposite to the cylindrical section 70, a printed circuit board 94 is fixed perpendicularly to the light axis 74.

A longitudinal CCD arrayed line sensor 96 is fixed to the printed circuit board 94 to face the window 92 (FIG. 3). A preamplifier for amplifying an output from the line sensor 96 is also mounted on the printed circuit board 94. The position of the light reception face of the CCD line sensor 96 must correspond to a plane on which a projected image from the projection lens 66 is focused.

Figure 5:
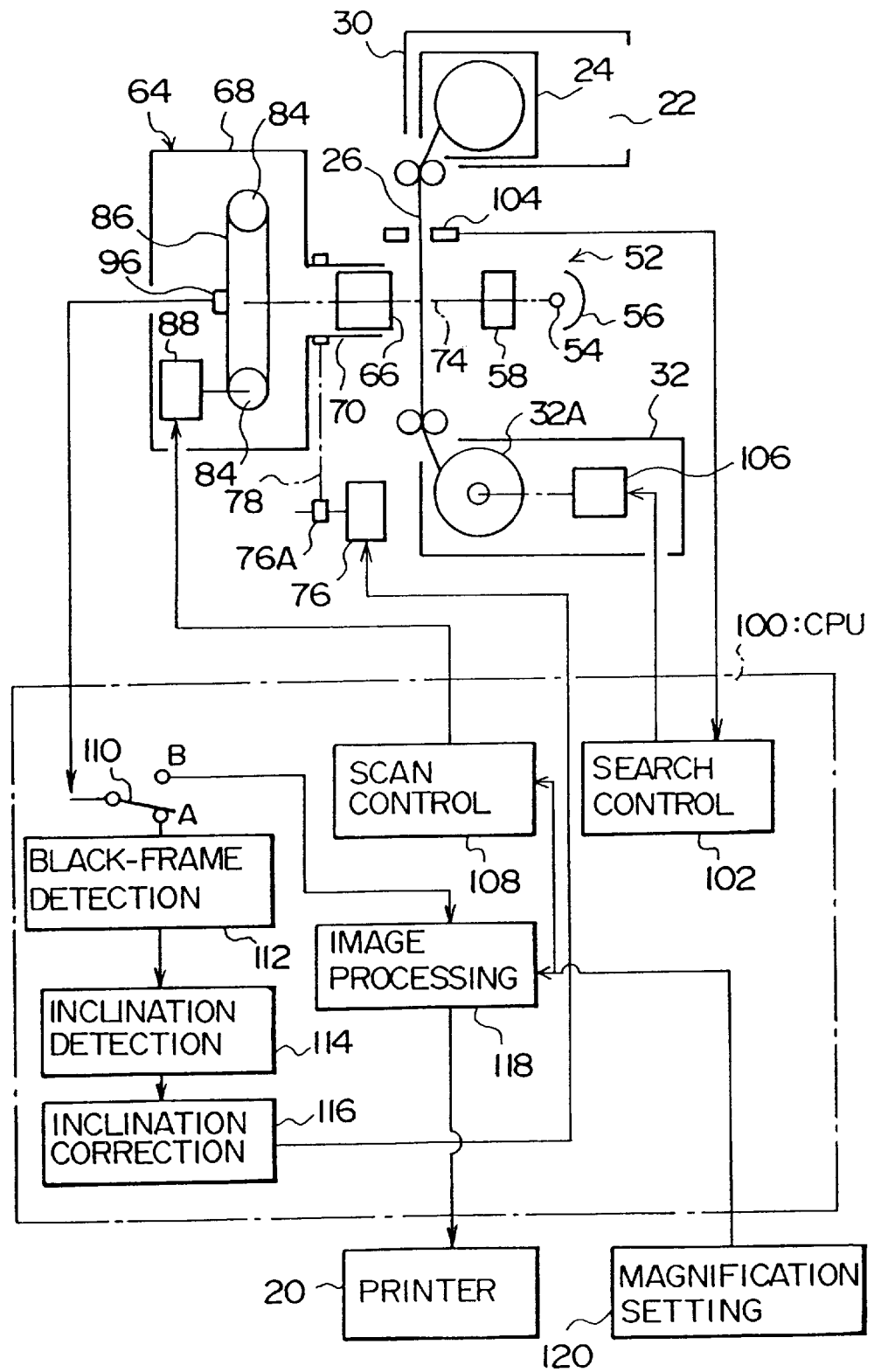
FIG. 5 is a block diagram illustrating a control system of the embodiment.

The CPU 100 incorporated in the computer body 10 has various functions as shown in FIG. 5. Although these functions are provided by software, FIG. 5 shows them by using a block diagram for convenience. A search means 102 detects a target frame of the film 26 by using a search blip mark (not shown) which is previously provided to each frame of the film 26. In other words, while counting outputs from a blip sensor 104 provided at the vicinity of a running path of the film 26, the target frame is discriminated by controlling a motor 106 of the take-up reel driving unit 32 and a motor (not shown) of the feed reel driving unit 30.

A scan control means 108 outputs an operating signal to activate the line sensor unit 64 when the target frame is located at a predetermined position within a projection range including the light axis 74. More specifically, the motor 88 is actuated to move vertically the line sensor 96 in parallel on the image-focused plane for reading or scanning the projected image. During the scanning, a lamp 54 of the light source 52 is kept on.

A circuit changing switch 110 is used for connection to Side A in FIG. 5 at the first or preliminary scanning and for connection to Side B at the second or real scanning. A black frame detecting means 112 detects a black frame region by using image signals read by scanning operation of the line sensor 96 when the circuit changing switch 110 is connected to Side A.

This black frame is a peripheral portion of an original, that is, a portion which appears in the external area of the original image when printed. There have been proposed various types of an algorithm for detecting a black frame. For example, when the scanning line runs from black frame to an original image area, a predetermined number or more contiguous black pixels turns to a series of continuous white pixels on the scanning line, so that a boundary between a black frame and an original can be detected.

After the black frame is detected, an inclination detecting means 114 detects or discriminates the inclination angle of the projected and read image of the original by detecting the inclination angle of the image frame of the rectangular projected image. An inclination correcting means 116 actuates a motor 76 to correct the inclination of the image frame. As a result, the entire line sensor unit 64 rotates to put the line sensor 96 in parallel with a side of the projected image.

An image processing means 118 performs predetermined or desired image processing after reading outputs from the line sensor 96 when the circuit changing switch 110 is connected to Side B for the main or real scanning. For example, it performs image enhancement, image inversion, image expansion or reduction, spacial filtering processing, trimming, masking, or the like.

In the image processing, a moving speed of the line sensor 96 in the subsidiary scanning direction is changed according to a magnification ratio (scale factor). If a magnification ratio set by a magnification setting means 120 is greater than said reference magnification, a feed speed of the line sensor 96 is lowered. If it is smaller than the reference magnification ratio, the feed speed of the line sensor 96 is increased. It should be noted that these speeds are in inverse proportion to a ratio of the set scale factor to the reference magnification ratio.

Operation procedures of this embodiment are now described. When the cartridge 24 is inserted into the cartridge loading slot 22 and loaded in the feed reel driving unit 30, a head lead of the roll film 26 is pulled out downward. Then, the head lead of the film 26 is guided to the take-up reel driving unit 32 by the guide rollers 34, 34, 36, and 36. The head lead of the film 26 is put between the reel 32A and the drive belt 40 and then wound on the reel 32A.

Figure 6:
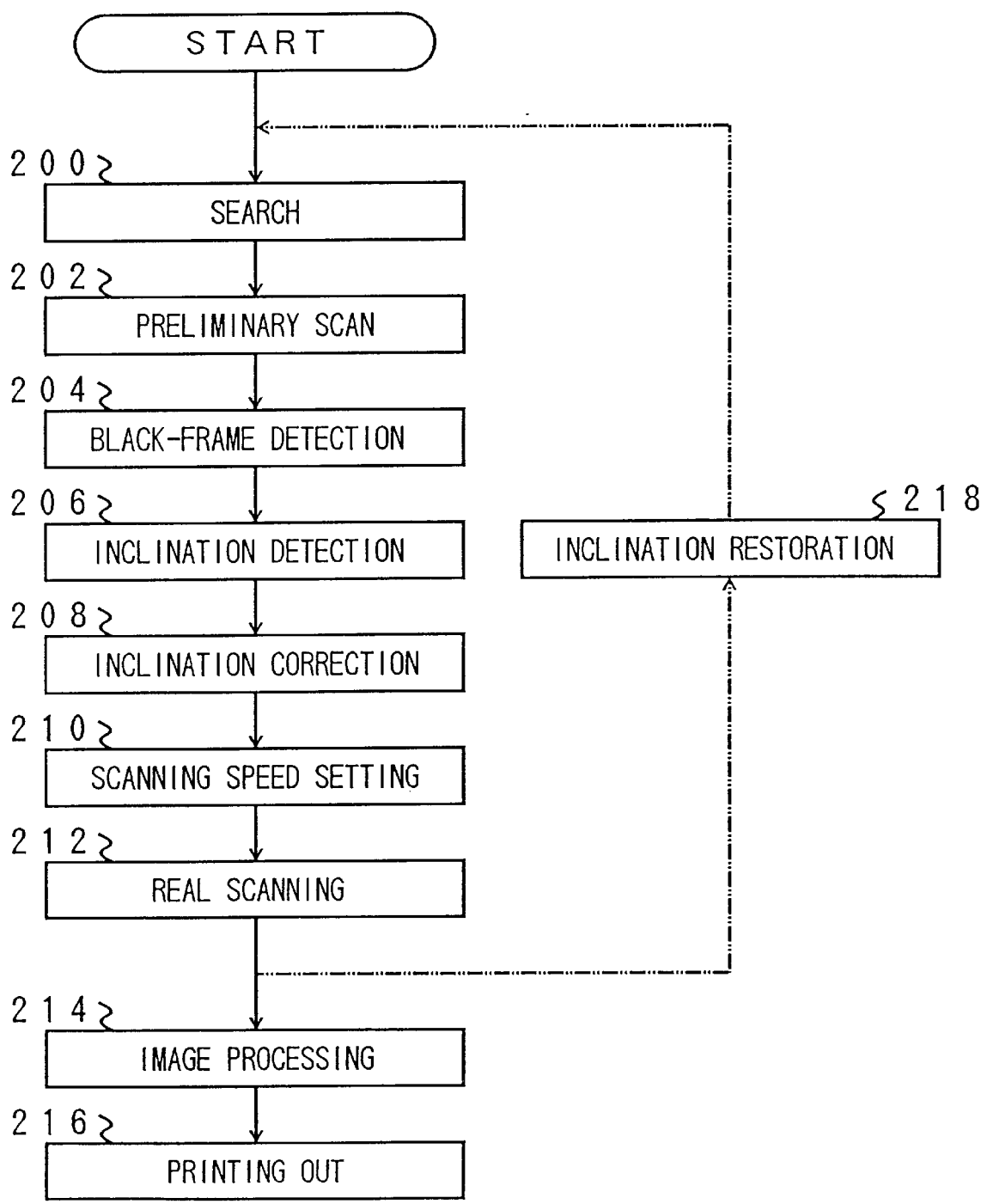
FIG. 6 is a flow chart of the operations of the embodiment.

A search-blip mark is provided to each frames of the film 26 in advance, and the blip is detected (step 200 in FIG. 6) by the blip sensor 104 (FIG. 5) such as a phototransistor while the film 26 is running. The frame of a retrieval or search target is discriminated by counting blips in the search means 102. When a target frame is detected, it is located within a projection range (frame) including the light axis 74 and feeding of the film 26 is stopped. Then, reading an image of this frame is started.

This first image reading process is preliminary done for obtaining an inclination of the projected image, therefore, it is called preliminary scanning (step 202). In this preliminary scanning, the scan controlling means 108 turns the circuit changing switch 110 to connect to Side A to turn on the lamp 54 of the light source 52. Then, an image in the frame is expanded approx. two-fold by the projection lens 66 to be projected on the movable plate 80.

The movable plate 80 is driven by the motor 88 so that the line sensor 96 moves from one side to the other side of the entire projection range of the projected image. During moving operation, the line sensor 96 reads the projected image on the image-formed plane. During this scanning with the line sensor 96 (preliminary scanning), the outputs from the line sensor 96 are amplified by the preamplifier disposed on the circuit board 94 and sent to the computer main frame 10.

In this preliminary scanning, the feed speed of the line sensor 96 is previously set. For example, the feed speed corresponds to the aforesaid reference magnification (scale factor). The speed of the servo motor 88 at the reference magnification or the number of steps required per second, PPS (pulse per sec.) can be determined, for example, as described below.

It is assumed that the number of pixels of the line sensor 96 is n=5,000 and that 50 ns (nano-seconds) is a time required for outputting an information of a single pixel. Pixel of the line sensor means an elemental area of the light emitting array in the line sensor. On these conditions, time t required for single main directional (or horizontal) scanning of the line sensor 96 can be obtained by a formula, $$t=50(ns/\text{pixel}) \times 5,000(pixels/line)=250(\mu s/line).$$

In other words, scanning of single main scanning line requires 250 $\mu$s (micro-seconds).

Figure 7:
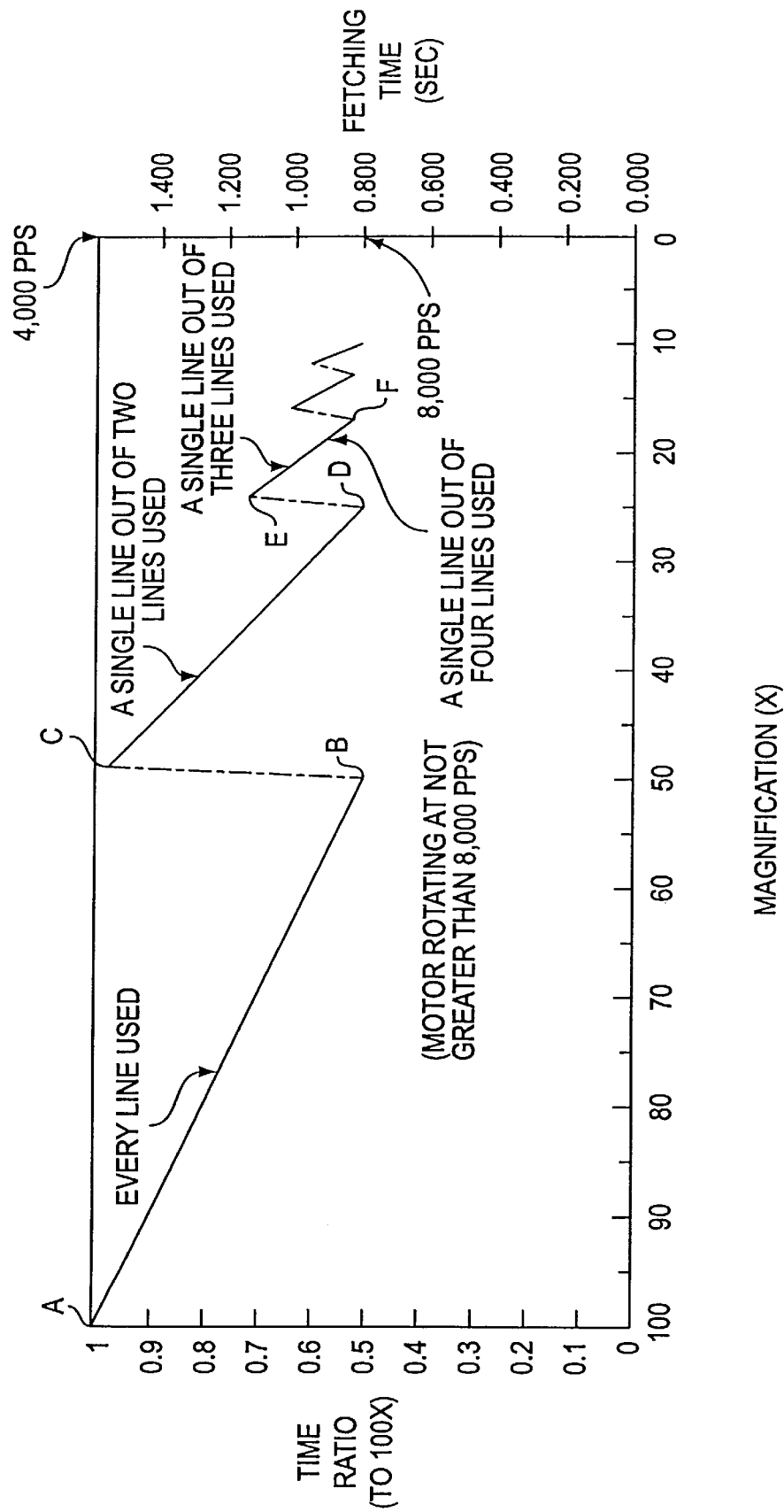
FIG. 7 is a diagram illustrating a relationship between a magnification factor and a motor speed.

It means that the main scanning should be repeated with moving or shifting the main scanning line to the subsidiary direction at 250 $\mu$s intervals. Accordingly, since 250 $\mu$s is required for time T needed for feeding of the line sensor 96 by a single step of the stepping servo-motor 88, the motor 88 should run at a speed of $1/(250 \times 10^{-6})$=4,000 PPS. In FIG. 7, point A indicates an operating point in which the motor 88 rotates at a stepping speed of 4,000 PPS, and it is applied to an output at a magnification ratio of 100 in this embodiment.

The CPU 100 determines a black frame region surrounding the original image included in a projected image through the black frame detecting means 112 by using an image signal obtained by this preliminary scanning (step 204). Then, the inclination detecting means 114 determines an inclination angle of the projected image from the black frame (step 206). The inclination angle can be determined by detecting the rectangular black frame which is a circumference of the image of the original. After the determination of the inclination angle of the image, the rotary frame 68 is rotated by the servo motor 88 so that the inclination angle becomes zero. In other words, the side in a lengthwise direction of the line sensor 96 is matched with a side of the black frame (step 208).

The above scanning operations are preliminary for a match between the inclination of the projected original image and the inclination of the line sensor 96. Real and main scanning for reading the projected original image is performed after the preliminary scanning (step 212). Prior to the real scanning, is set a sub-scanning speed, i.e., a feed speed of the line sensor 96 in the subsidiary scanning direction (step 210).

The subsidiary scanning speed varies according to a magnification factor or ratio which has been set. In other words, the feed speed of the line sensor is set in inverse proportion to a ratio of a set magnification to a reference magnification.

Although the feed speed of the line sensor 96 is increased when this ratio is smaller than 1, it is understood that the feed speed is limited in taking into consideration of a load torque and an inertia torque of the motor 88. For example, if an upper limit speed of the motor 88 is 8,000 PPS, the magnification ratio can be decreased to point B in FIG. 7, that is, the magnification of the read image can be 50 times. If an attempt is made to further decrease the magnification, however, the motor 88 exceeds its limit of 8,000 PPS, so it fails.

Therefore, according to the present invention, if the magnification or scale factor is decreased to a level lower than the point B, the speed of the motor 88 is lowered and also the main scanning lines are reduced or deleted so that a single main scanning is performed for two steps of feeding travel of the line sensor 96. A straight line CD in FIG. 7 indicates the relationship between the magnification factor and the motor speed wherein, after the motor speed is decreased by about ½, the speed of the motor 88 is again increased along with the decrease of the magnification factor. During this image scanning operation, only a single main scanning line out of two main scanning kinds is read or scanned to produce image signals. In the same manner, a straight line EF indicates the relationship between the magnification factor and the motor or feed speed wherein, after the motor speed is decreased by about ⅓, the speed of the motor 88 is again increased in compliance with the decease of the magnification factor. A single scanning line out of three main scanning lines is used for reading or scanning.

In the same manner, the magnification factor can be lowered without increasing the speed of the motor 88 to a level exceeding the upper limit, by increasing the motor speed with a decrease of the scale factor after decreasing the speed by 1/n and by using a single main scanning line out of n main scanning lines (n is a positive integer of 2 or greater). Like this, is determined a feed speed (scanning speed) in the subsidiary scanning direction of the line sensor 96 corresponding to a set magnification factor (step 210 in FIG. 6), and real scanning is performed with feeding of the line sensor 96 at this speed (step 212).

Then, the line sensor 96 reads an image again, image processing for the output image signal is performed by the image processing means 118 (step 214), and the resultant image is printed to the printer 122 (step 216). Further, the resultant processed image data is stored in an external memory such as an optical magnetic disk or transferred to another image processing device.

The above description is made for expansion and reduction of read images in the subsidiary scanning direction of the line sensor. Expansion and reduction of read images in the main scanning direction of the line sensor should be performed electrically according to the prior art. In detail, a read image is reduced by bit-reducing the output signals of the read image at a certain rate according to the magnification ratio in the direction of main scanning. The read image is expanded by outputting identical pixel signals repeated or bit-overlapped at a certain rate.

Figure 8A:
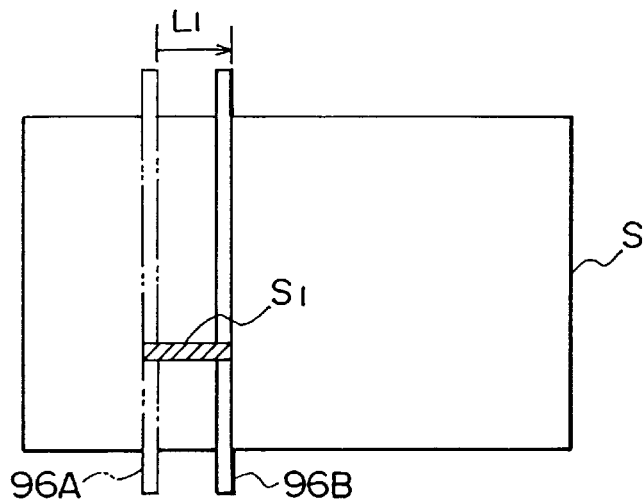
FIGS. 8A to 8C are operation description diagrams each illustrating an image area read in a single pixel of the line sensor of the embodiment.
Figure 8B:
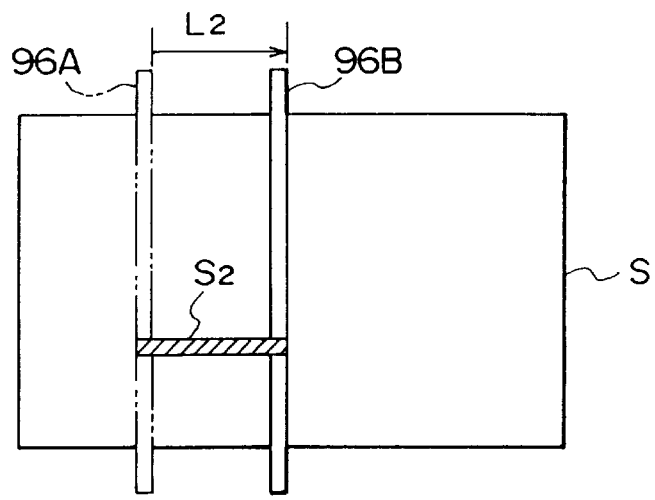
Figure 8C:
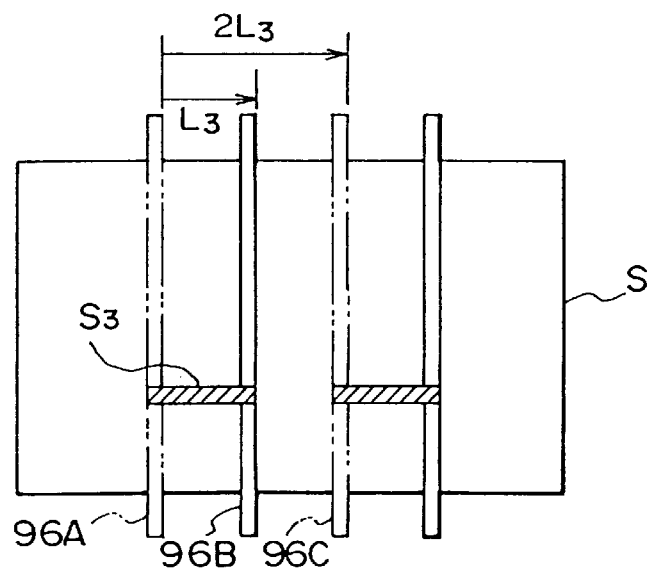

This section describes advantages of changing the feed speed in the subsidiary scanning direction of the line sensor 96 according to the present invention with reference to FIGS. 8A to 8C. In these drawings, S indicates a projected image to be read by the line sensor 96. Assuming that the line sensor 96 is moved at a speed of 4,000 PPS corresponding to the reference magnification (100 times; See the point A in FIG. 7), the line sensor 96 moves from position 96A to position 96B by a single pulse or step, as exaggeratingly illustrated in FIG. 8A. This moving or travelling length $L_1$ corresponds to a single step of the servo motor 88.

In a case that the line sensor 96 is formed of the array of charge coupled devices (CCD), a pixel information in the single step feed is stored in each pixel (each CCD element). $s_1$ indicates an image area read by and stored in a single pixel of the line sensor in the subsidiary direction. When the magnification factor is decreased and the feed speed (i.e., scanning speed in the direction of subsidiary scan) of the line sensor 96 is increased with it, a moving distance $L_2$ in a single step of the stepping motor 88 is extended as shown in FIG. 8B and an image area $S_2$ read by and stored in each pixel of the line sensor 96 is also expanded during the time. According to the present invention, therefore, an image information within thus expanded image area $S_2$ can be stored in each pixel of the line sensor 96 even if the feed speed of the line sensor 96 is increased.

On the other hand, in a method of simply deleting intermittently main scanning lines without increasing the feed speed of the line sensor, image information data stored in each pixel of the line sensor is decreased according to a ratio of the deleted or thinned-out lines. Therefore, according to the invention, there is an advantage that an image information can be read more faithfully to the original images.

If the magnification factor is further decreased and reaches the limit of the stepping speed of the motor 88 (corresponding to the point B in FIG. 7), an output is made for a single main scanning line out of two main scanning lines, which is shown in FIG. 8C. Particularly, the feed speed is lowered to approx. ½ and each pixel of the line sensor 96 reads only the area $s_2$ in the first step in which the line sensor 96 moves from the position 96A to the position 96B. The information to be read in the second step in which it moves from the position 96B to the position 96C is not read to be discarded.

When a lot of frames are to be searched continuously, a next target frame can be searched immediately after an image signal of the real scanning of the concerned image frame is completed to be stored in the CPU 100. After the real scanning of the preceding image frame, it is desirable to return rotation angle of the line sensor 96, which has been inclined to match the inclination angle of the preceding target image frame, to the original state, for the search of next target image frame (step 218 in FIG. 6). The reason why the rotation or inclination angle of the line sensor 96 is returned to the original state is that a black frame may be detected incorrectly because a projected image of the original deviates from a scanning or reading range of the line sensor 96 if the scanning range inclines significantly in a reverse direction to a frame of the film.

In a conventional microfilm scanner or projector, the light source 52 and the projection lens 66 are usually arranged in the horizontally-reverse direction to those of the embodiment shown in FIG. 3. Accordingly, if a microfilm such as used for a conventional device is used in this embodiment, the projected image will be reversed to be mirror image. In such a case, it can be electrically converted to a correct image through image processing and this kind of processing is easy.

Although a central axis of the rotation of the line sensor unit 64 is matched to the light axis 74 in the above embodiment, they can be unmatched. Since an image of the original is generally taken into an area displaced toward a side within a projection range, it is possible to reduce the possibility that the projected area of the original image deviates from the scanning range of the line sensor, by deviating the central axis of the rotation of the line sensor unit 64 to the side toward which the projection area is displaced.

Although the projection lens 66 shown in FIG. 3 is set apart from the film 26, the head of the projection lens can be extended to the film side and the film be set in contact with a transparent glass plate for film positioning upon which the film can slide. It improves an accuracy of the relative positioning between the film and the projection lens. Since the projection lens is disposed in the rotary frame 68 of the line sensor unit, it leads to a higher accuracy of the relative positioning between the film, the projection lens, and a feeding plane of the line sensor. Therefore, photographed images can be projected and read with high accuracy even through a projection lens having a fixed focus and a low magnifying power.

As described in detail above, according to the present invention, the feed speed of the line sensor in the subsidiary scanning direction is changed in inverse proportion to a level of an output magnification ratio of the images. Accordingly, the feed speed of the line sensor can be increased when the low magnification ratio is required, and therefore it shortens the image reading time.

Furthermore, according to the present invention, when the feed speed of the line sensor reaches almost the maximum speed in compliance with a decrease of the magnification, the feed speed is lowered by 1/n and images are read by using only outputs of a single main scanning line out of $\underline{n}$ main scanning lines of the line sensor, therefore, the magnification ratio can be decreased without being restricted by the limit of the feed speed of the line sensor.

What is claimed is:

1. A method of reading and processing an image by a sensor, said sensor comprising at least a line of detectors disposed in a first direction for detection lines of pixels of the image, said sensor moving relative to the image in a second direction perpendicular to the first direction and reading the image and providing image processor that produces an output image, the method comprising the steps of:

setting a magnification ratio of the output image to the image, the magnification ratio being in one of n contiguous magnification ratio ranges between a reference magnification ratio and a minimum magnification ratio;

setting a moving speed of the sensor relative to the image as a function of the magnification ratio such that, within each magnification ratio range i, for i=2 to n, the moving speed of the sensor decreases, in inverse proportion to an increase in the magnification ratio, from a maximum speed at a lowest magnification ratio in the magnification ratio range to the maximum speed decreased by 1/i at a highest magnification ratio in the magnification ratio range, and, for i=1, the moving speed of the sensor decreases, in inverse proportion to an increase in the magnification ratio, from the maximum speed at a lowest magnification ratio in the magnification ratio range to a reference speed at a highest magnification ratio in the magnification ratio range; and reading and processing only one of every i lines of pixels of the image when the magnification ratio is in the magnification ratio range i, for i=1 to n.

2. The method according to claim 1, wherein a size of said pixels increases as the moving speed of the sensor increases.

3. The method according to claim 1, further comprising the steps of:

detecting a black frame around the image;

determining an inclination angle of a side of the black frame relative to said first direction; and rotating said sensor such that said side of the black frame is parallel to the first direction.

4. An apparatus for reading and processing an image, comprising:

a sensor which reads the image said sensor comprising at least a line of detectors disposed in a first direction for detecting lines of pixels of the image, said sensor moving relative to the image in a second direction perpendicular to the first direction; and an image processor receiving image signals from said sensor and producing an output image magnified relative to the image in accordance with a magnification ratio, the magnification ratio being in one of n contiguous magnification ratio ranges between a reference magnification ratio and a minimum magnification ratio, wherein said sensor moves at a moving speed relative to the image as a function of the magnification ratio such that, within each magnification ratio range i, for i=2 to n, the moving speed of the sensor decreases, in inverse proportion to an increase in the magnification ratio, from a maximum speed at a lowest magnification ratio in the magnification ratio range to the maximum speed decreased by 1/i at a highest magnification ratio in the magnification ratio range, and, for i=1, the moving speed of the sensor decreases, in inverse proportion to an increase in the magnification ratio, from the maximum speed at a lowest magnification ratio in the magnification ratio range to a reference speed at a high magnification ratio in the magnification ratio range; and wherein said sensor reads only one of every i lines of pixels of the image when the magnification ratio is in the magnification ratio range i, for i=1 to n.

5. The apparatus according to claim 4, wherein a size of said pixels increases as the moving speed of said sensor increases.

6. The apparatus according to claim 4, further comprising:

a black frame detector receiving image signals from said sensor and detecting a black frame around the image;

an inclination detector for determining an inclination angle of a side of the black frame relative to said first direction; and an inclination corrector for rotating said sensor such that said side of the black frame is parallel to he first direction.

\* \* \* \* \*